(No Model.)

C. E. DRESSLER.
ELECTRIC GENERATOR OR MOTOR.

No. 498,538. Patented May 30, 1893.

WITNESSES:
Francis P. Reilly
W. F. Brückel

INVENTOR
Charles E. Dressler
BY
ATTORNEY.

UNITED STATES PATENT OFFICE.

CHARLES E. DRESSLER, OF NEW YORK, N. Y.

ELECTRIC GENERATOR OR MOTOR.

SPECIFICATION forming part of Letters Patent No. 498,538, dated May 30, 1893.

Application filed September 15, 1892. Serial No. 445,947. (No model.)

*To all whom it may concern:*

Be it known that I, CHARLES E. DRESSLER, of the city of New York, in the county and State of New York, have invented certain new and useful Improvements in Electric Generators or Motors, which invention or improvements are fully set forth and illustrated in the following specification and accompanying drawings.

The object of this invention is to provide an efficient self excited dynamo-electric machine, which shall at the same time within itself supply, if desired, a large volume current of low voltage while generating a current of high voltage or vice versa.

The invention will first be described in detail and then particularly set forth in the claims.

Figure 1:
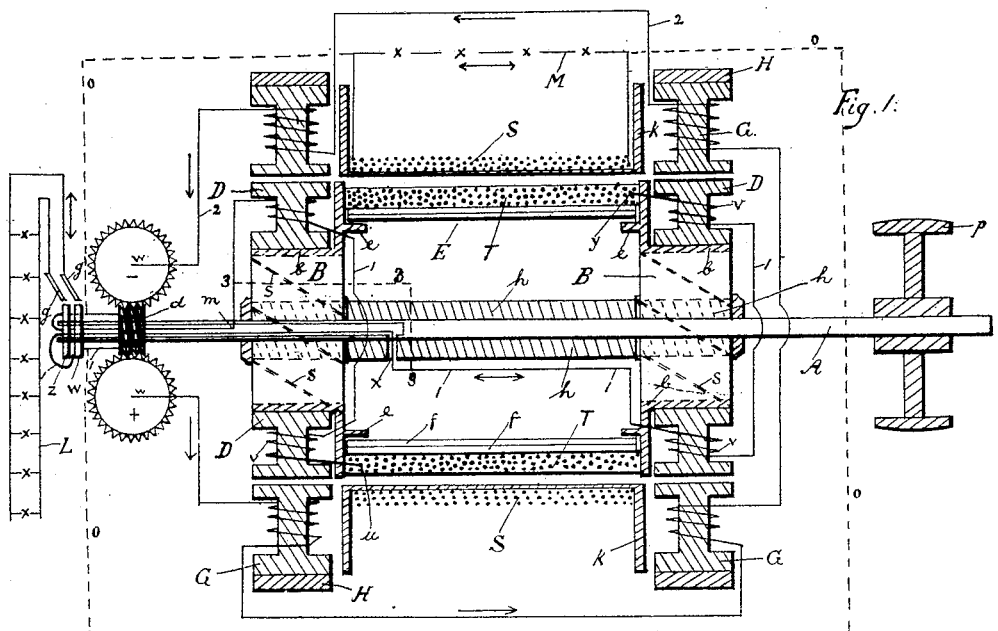
Figure 6:
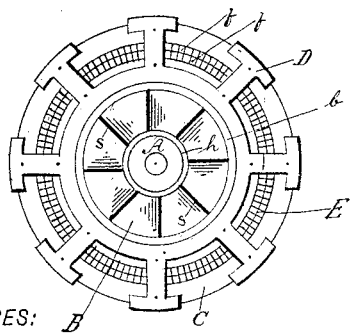
Figure 7:
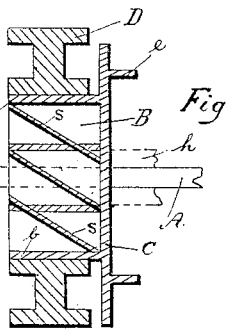

In the accompanying drawings, Figure 1 shows a horizontal section through the machine which I regard of the best form of embodiment of the invention. Figs. 2, 3, 4, and 5 show modified details (enlarged) of the field pole-pieces, hereinafter described. Figs. 6 and 7, show respectively a front view and a sectional side elevation of the armature.

In said figures the several parts are indicated by reference letters as follows:—In suitable bearings (not shown) which may be provided at or near each end of the armature shaft A, said shaft is mounted in any usual manner, carrying a driving pulley $p$ at one end and a pole-changer or other current rectifying device $d$ at its other end. Mounted upon said shaft are two wheels or cylinders B, preferably of brass or other non-magnetic material. Each of said cylinders is composed of an outside rim $b$, connected by radial arms or spokes $s$, to a central hollow shaft $h$, bored out to receive the shaft A to which it is secured so as to revolve with it. The spokes $s$, are made of flat bars or strips of metal, set at an angle like portions of a helix around the circumference of the shaft $h$ and the inner circumference of the rim $b$. In the rotation of the armature these helically disposed strips act like the blades of a screw-propeller or fan-blower and force a strong current of air through the interior of the armature, thus effectively preventing any tendency to the heating of the same in generating the electric current desired. The radial arms or fans $s$, may be secured directly to the shaft A, or to short hubs thereon, instead of upon the hollow shaft $h$, if desired. A circular side plate C, forms a part of each cylinder B and said plate is provided with a short cylindrical flange $e$. Secured radially at suitable intervals to the rims of the cylinders B, are the armature pole-pieces D which when suitably wound with insulated wire, complete the armature proper with the exception of an annular core E surrounding the armature shaft, now to be described. Said core is composed of a series of soft iron rods or bars, $f$, preferably round in cross-section, which rest upon and are built up around the cylindrical flanges $e$. Said bars are suitably insulated from each other by windings of insulating tape or thread commonly used in the art, and may be as numerous as the size of the machine may require and the space at command will permit. Any suitable commutator or pole-changer may be used.

The special form of pole-changer shown at $d$, forms no part of this invention, as the same is described and claimed in an application for other Letters Patent, Serial No. 445,948, filed by me herewith. One important advantage, however, of this device is that the armature of the machine may be rotated in either direction without making any change in the adjustment of the pole-changer.

The field magnets or pole-pieces G are placed radially in close proximity to the path of the armature pole-pieces, which they surround, and are secured to cylinders or rings H, which rings are suitably secured to the frame or bed of the machine.

Figure 2:
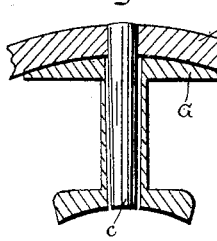
Figure 3:
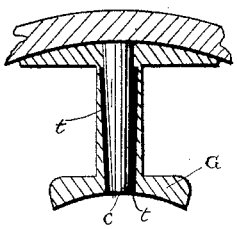
Figure 4:
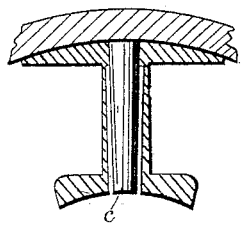
Figure 5:
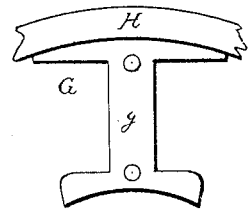

The field magnets G, are composite, that is, they may be made as shown in Figs. 2, 3, 4, 5, the important point being to preserve as perfect magnetic insulation as possible between the soft iron and steel used in said pole-pieces. Fig. 2, shows a pole-piece, and a portion of its outer ring H, each of soft iron, in cross section, the ring and pole-piece bored out and a hardened steel pin $c$ driven into the bore. The pin fits tight in the ring in order to be held in place, but an air-space—a bad conducting medium—surrounds the main body of the pin, where it passes through the pole-piece. Fig. 3, shows a pin driven into a hole in the pole-piece under the ring—not through it—the hole being lined with some solid non-conducting material $t$, such as zinc, mica, paper, wood, &c. I have found zinc a good metal to use for such purpose. Fig. 4 is the same as Fig. 3, except that a stratum of air takes the place of an inserted solid non-conductor. Any suitable number of pins may be used in each pole-piece arranged in lines or shapes to best suit the shape of the pole-piece. Fig. 5, is a side view of a field pole-piece built up of bars $g$ pinned together side by side—the bars being alternately of soft iron and hardened steel—which should have an interposed non-conducting medium, either air or some solid material, between them. Unless a proper insulation be preserved between the hardened steel—which must be magnetized, so as to present a series of permanent magnets—the magnetism of the steel becomes dissipated, or lost by absorption into the soft iron, and this being the case, the machine can not retain its self exciting character. This feature of my invention I consider of great importance which has successfully accomplished the result of making the alternating current dynamo-machine of any power, a feasible and trustworthy quick and sensitive self exciting machine, such as has not heretofore been successfully attained in practice.

Surrounding the armature's built up core, E, is a spool of non-magnetic material, $k$, wound in the usual manner with a coil S, of insulated wire, which coil is inductively excited, when the armature is rotated, by the alternating current passing back and forth from one set of end-pole-pieces of the armature to another set of pole-pieces on the other end of the armature, through the wire coil T of insulated wire, wound around the laminated core E, which coil is in circuit with and connects the coils $v$ wound on opposite end pole pieces D of the armature, as more particularly described below.

The method of winding and connecting the several parts of the machine, and its mode of operation, are as follows:—The armature circuit is effected thus:—The wire 1, starting from the pole-changer $d$, is connected to the rotary disk collector $w$, whence with said collector in circuit, the wire 1, passes clear of the disk collector $z$, into the bore of the armature shaft, for some distance whence it emerges at $x$ and continuing on is wound into a coil around each armature pole-piece in turn as seen at D and D, on the right (Fig. 1) whence leaving the last pole-piece, the wire is connected at the point $y$ to the coil T, which coil is wound around the laminated core E, of the armature. The coil T is preferably formed of wires wound in multiple instead of with but a single wire, in order to permit of a greater number of turns of wire and at the same time avoid all resistance in the coil itself to the passage of the current. At the point $u$, the wire 1 leaves the coil T, and passing successively around the pole-pieces D, on the left, Fig. 1, leads to the armature shaft, and enters its bore at the point $m$, whence said wire passes out of said shaft and connecting with the disk collector $z$ as part of the circuit then leads through the collector $w$, but insulated therefrom, whence it connects with the pole-changer $d$, completing the entire armature winding.

The field circuit is effected thus:—Connected with the pole-changer $d$, whose surface forms a worm-shaft are two worm-wheel collectors marked $+$ and $-$, (or plus and minus) mounted to rotate in any suitable bearings. From the axis of the collector $+$ (or plus) the wire 2 leads to and around the field pole-pieces G forming, in turn, coils thereon, on the left and thence to the pole-pieces G, on the right (Fig. 1) forming coils thereon, whence the other free end of the wire 2 leads to the axis of the collector marked $-$ (or minus.) The field magnets are thus supplied with a continuous current by the pole-changer $d$ and its collectors $+$ and $-$, which current is a part of the main current generated—the machine being thus self-exciting—the field magnets, as before explained and described, being specially constructed to this end.

The remainder of the current not utilized in exciting the field may be divided and utilized as an alternating current as follows:— The brushes $g$, $g$, may lead a part of the current to a lamp-circuit L, or to any power-circuit, and the coil S, on the spool $k$, acting as a secondary coil to the armature core E and coil T, may form another circuit for light or power as seen at M.

As thus described the external work of the machine (that is, excluding the work of exciting its own field) will be the sum of the work performed respectively by the two circuits L and M. If it be desired to take all of the work from the coil S, alone, then the wire 1, instead of connecting with the pole-changer, may form a closed circuit as indicated by the dotted line 3, and the end wires of the coil S, then lead to the pole-changer (where the wire 1, is connected) as indicated by the dotted lines $o$, $o$. In this case the armature circuit should be wound with fine wire to produce a higher-tension-current than if the armature were employed to deliver part of the current as before described.

Having thus fully described my said invention, I claim—

1. An electric generator or dynamo-machine provided with composite field pole-pieces of soft iron and magnetized steel alternated with intervening media of low or non-magnetic conductivity.

2. A composite field pole-piece, for electric generators or dynamo-machines, having an exterior of soft iron, an interior of magnetized steel and an intervening medium of low or non-magnetic conductivity.

3. A field pole-piece for electric generators or dynamo-machines, composed of soft iron, magnetized steel and zinc the latter interposed between the other two metals.

4. An armature for an electric generator or dynamo-machine consisting of a shaft provided with cylinders, mounted thereon, and having inner cylindrical flanges as $x$, for the purposes set forth.

5. An armature for an electric generator or dynamo-machine, consisting of a shaft provided with a frame-work, for carrying the armature pole-pieces and with a laminated core of soft iron annularly surrounding the shaft, substantially as set forth.

6. In an electric generator or dynamo-machine, in combination with an armature provided with a laminated core and a coil of wire wound on said core in circuit with the winding of the armature proper, an annular induction coil surrounding said core and capable of being inductively excited by magnetism in said core, substantially as set forth.

CHARLES E. DRESSLER.

Witnesses:
C. C. VAN SANTEN,
FRANCIS P. REILLY.